United States Patent
Sugita et al.

(10) Patent No.: US 10,724,581 B2
(45) Date of Patent: Jul. 28, 2020

(54) FRICTION PLATE AND HYDRAULIC TRANSMISSION APPARATUS

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kazuhiko Sugita, Nishio (JP); Makoto Nakazuru, Inazawa (JP); Hidetaka Ito, Nagoya (JP); Koji Nakamura, Nishio (JP); Takuya Okada, Toyota (JP); Isamu Hachisuwa, Nagoya (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 16/076,526

(22) PCT Filed: Mar. 15, 2017

(86) PCT No.: PCT/JP2017/010340
§ 371 (c)(1),
(2) Date: Aug. 8, 2018

(87) PCT Pub. No.: WO2017/159715
PCT Pub. Date: Sep. 21, 2017

(65) Prior Publication Data
US 2019/0048942 A1  Feb. 14, 2019

(30) Foreign Application Priority Data
Mar. 15, 2016  (JP) .................... 2016-051659

(51) Int. Cl.
*F16D 13/64* (2006.01)
*F16D 25/0638* (2006.01)
(Continued)

(52) U.S. Cl.
CPC ......... *F16D 13/648* (2013.01); *F16D 13/72* (2013.01); *F16D 25/0638* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2004/0050646 A1* | 3/2004 | Matthes | F16D 13/648 192/107 R |
| 2007/0199794 A1* | 8/2007 | Miyazaki | F16D 13/648 192/113.36 |

(Continued)

FOREIGN PATENT DOCUMENTS

| | | |
|---|---|---|
| DE | 10 2012 017 660 A1 | 3/2014 |
| DE | 10 2013 010 651 A1 | 12/2014 |

(Continued)

OTHER PUBLICATIONS

Jun. 20, 2017 International Search Report issued in International Patent Application No. PCT/JP2017/010340.

*Primary Examiner* — David J Hlavka
(74) *Attorney, Agent, or Firm* — Oliff PLC

(57) ABSTRACT

A friction plate that is used in a friction engagement device configured to engage an input rotary member and an output rotary member with each other, the friction plate including a base plate having an annular plate shape; and a friction member provided on the base plate in a circumferential direction of the friction plate.

21 Claims, 5 Drawing Sheets

(51) Int. Cl.
*F16H 45/02* (2006.01)
*F16D 13/72* (2006.01)
*F16D 48/02* (2006.01)
*F16D 69/00* (2006.01)

(52) U.S. Cl.
CPC .............. *F16D 25/14* (2013.01); *F16H 45/02* (2013.01); *F16D 2069/004* (2013.01); *F16D 2300/08* (2013.01); *F16D 2300/10* (2013.01); *F16H 2045/0284* (2013.01)

(56) References Cited

U.S. PATENT DOCUMENTS

| | | | |
|---|---|---|---|
| 2011/0240432 A1* | 10/2011 | Takikawa | F16H 45/02 192/3.29 |
| 2013/0168199 A1* | 7/2013 | Higashijima | F16D 13/64 192/107 M |
| 2014/0346003 A1* | 11/2014 | Okamura | F16D 13/64 192/107 M |
| 2015/0152923 A1* | 6/2015 | Youngwerth | F16D 13/648 192/107 R |
| 2015/0362023 A1* | 12/2015 | Tohyama | F16D 13/72 192/70.12 |

FOREIGN PATENT DOCUMENTS

| | | |
|---|---|---|
| EP | 2 136 096 A1 | 12/2009 |
| JP | 2002-156021 A | 5/2002 |
| JP | 2011-214595 A | 10/2011 |
| WO | 2014/180478 A1 | 11/2014 |

\* cited by examiner

FRICTION PLATE AND HYDRAULIC TRANSMISSION APPARATUS

BACKGROUND

The disclosure of the present disclosure to be disclosed in this specification relates to a friction plate and a hydraulic transmission apparatus.

A friction plate of this type has been hitherto proposed that includes a base plate having an annular plate shape and a plurality of friction members fixed to at least one side of the base plate, at predetermined intervals in a circumferential direction of the base plate, and that is configured to press the friction members into contact with a counterpart plate (another friction plate) opposite to the friction members when the clutch is engaged (e.g., see Japanese Patent Application Publication No. 2002-156021). After each friction member of this friction plate is formed by punching, a step portion is formed by compression molding at each end of the friction member in the circumferential direction in order to remove edges in the circumferential direction resulting from punching. Thus, scraping off of an oil film by remaining edges can be prevented, so that a sufficient oil film is formed between the friction plate and the counterpart plate to stabilize the drag torque.

SUMMARY

In the above friction plate, a hydraulic fluid flowing while the clutch is disengaged is compressed as a clearance between the friction plate and the counterpart plate narrows at the upstream-side step portion that is on an inflow side of the clearance, and is expanded as the clearance between the friction plate and the counterpart plate widens at the downstream-side step portion that is on an outflow side of the clearance. Thus, the pressure of the hydraulic fluid tends to change toward the positive pressure side at the upstream-side step portion and change toward the negative pressure side at the downstream-side step portion. When the upstream-side step portion and the downstream-side step portion are formed to be equal to each other in width and height as designed, the amount of change toward the positive pressure side and the amount of change toward the negative pressure side become substantially equal to each other and offset each other. However, when the amount of change in the hydraulic fluid pressure toward the negative pressure side becomes larger than that toward the positive pressure side, for example, due to the balance between the widths in the circumferential direction, the heights, etc. of the step portions, the negative pressure draws the friction plate and the counterpart plate to each other, which may result in an increase in the drag torque.

Therefore, an exemplary aspect of the disclosure reduces the drag torque by forming portions of the friction member on both sides in the circumferential direction so as to make the amount of change toward the positive pressure side larger than the amount of change toward the negative pressure side.

The friction plate of the present disclosure is a friction plate that is used in a friction engagement device configured to engage an input rotary member and an output rotary member with each other, and that includes a base plate having an annular plate shape and a friction member provided on the base plate in a circumferential direction thereof, wherein: the friction member has a contact portion that comes in contact with an object to be subjected to friction, when the friction engagement device is engaged, and a portion of the friction member on at least one side of the contact portion in the circumferential direction has a smaller height from a plate surface of the base plate than the contact portion; and portions of the friction member on both sides of the contact portion in the circumferential direction are different in shape from each other such that, when these portions are regarded as an upstream portion and a downstream portion in the circumferential direction that are respectively on an upstream side and a downstream side of a fluid flowing in a state where the rotation speed of the input rotary member is higher than the rotation speed of the output rotary member, the amount of change in the fluid pressure toward the positive pressure side occurring at the upstream portion becomes larger than the amount of change in the fluid pressure toward the negative pressure side occurring at the downstream portion.

The portions of this friction plate on both sides of the contact portion in the circumferential direction that comes in contact with the object to be subjected to friction are different in shape from each other such that, when these portions are regarded as the upstream portion and the downstream portion in the circumferential direction that are respectively on the upstream side and the downstream side of the fluid flowing in the state where the rotation speed of the input rotary member is higher than the rotation speed of the output rotary member, the amount of change in the fluid pressure toward the positive pressure side occurring at the upstream portion becomes larger than the amount of change in the fluid pressure toward the negative pressure side occurring at the downstream portion. Thus, it is possible to prevent a negative pressure from acting excessively between the friction plate and the object to be subjected to friction, and thereby to prevent an increase in the drag torque. That the upstream portion and the downstream portion are different in shape from each other means that the upstream portion and the downstream portion can be different from each other in at least one of the width, the height, the tapered shape of an upper surface thereof, and the rounded shape.

DETAILED DESCRIPTION OF EMBODIMENTS

Next, an embodiment of the disclosure of the present disclosure will be described with reference to the drawings.

Figure 1:
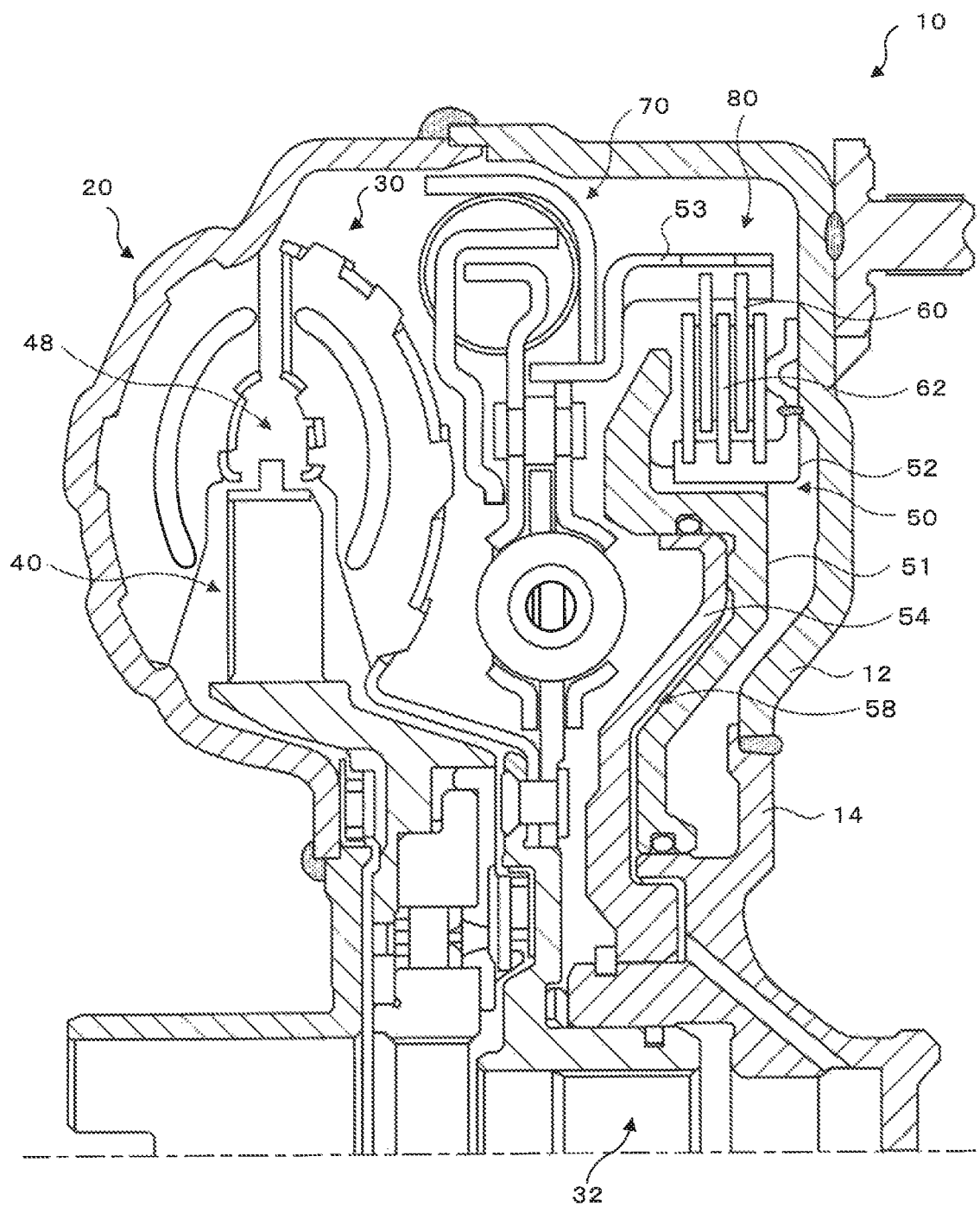
FIG. 1 is a configuration view showing a schematic configuration of a hydraulic transmission apparatus as an embodiment of the present disclosure.

FIG. 1 is a configuration view showing a schematic configuration of a hydraulic transmission apparatus 10 as an embodiment of the present disclosure. The hydraulic transmission apparatus 10 of this embodiment is structured as a torque converter that transmits a torque from an engine (not shown) installed in a vehicle. As shown in FIG. 1, the hydraulic transmission apparatus 10 includes: a front cover 12 coupled to a crankshaft of the engine through a front hub 14; a pump impeller 20 joined to an outer peripheral part of the front cover 12; a turbine runner 30 disposed coaxially with the pump impeller 20 so as to face the pump impeller 20; a stator 40 that regulates the flow of a hydraulic fluid from the turbine runner 30 toward the pump impeller 20; a multiple-disc lock-up clutch 50 that is housed in a lock-up chamber 80 and connected to the front hub 14; and a damper device 70 that is housed in the lock-up chamber 80 and connected to the lock-up clutch 50 and the turbine hub 32 that is joined to an inner peripheral part of the turbine runner 30. In this embodiment, an input shaft of a transmission device (not shown), such as a stepped automatic transmission (AT) or a continuously variable transmission, is connected to the turbine hub 32. In the hydraulic transmission apparatus 10 of this embodiment, a converter chamber 48 is formed by a space surrounded by the pump impeller 20, the turbine runner 30, and the stator 40.

The lock-up clutch 50 is a mechanism that can directly couple together the front cover 12 (front hub 14) as an input element and the turbine hub 32 as an output element. The lock-up clutch 50 includes: a lock-up piston 51 supported by the front hub 14 so as to be able to slide in an axial direction; an annular clutch hub 52 fixed to an inner wall of the front cover 12; a clutch drum 53 coupled to the turbine hub 32 through the damper device 70; a plurality of annular first plates 60 spline-engaged on an outer periphery of the clutch hub 52; a plurality of annular second plates 62 spline-engaged on an inner periphery of the clutch drum 53; and an annular member 54 fixed to the front hub 14 so as to be located more toward the damper device 70 than the lock-up piston 51. The plurality of first plates 60 and the plurality of second plates 62 are disposed alternately along the axial direction. In this embodiment, the first plate 60 is a separate plate having no friction members 64 mounted thereon, and the second plate 62 is a friction plate having a plurality of friction members 64 (see FIG. 2) mounted on a plate surface thereof. Of course, each of the first plate 60 and the second plate 62 may instead have a side on which a plurality of friction members is mounted and a side on which no friction members are mounted.

The annular member 54 and the lock-up piston 51 of the lock-up clutch 50 form an engaging oil chamber 58 that is divided from a lock-up chamber 80. Making the oil pressure inside the engaging oil chamber 58 higher than the oil pressure inside the lock-up chamber 80 causes the lock-up piston 51 to move toward the front cover 12 and press the first plate 60 and the second plate 62 into contact with each other, which can engage the lock-up clutch 50. Conversely, making the oil pressure inside the engaging oil chamber 58 lower than the oil pressure inside the lock-up chamber 80 causes the lock-up piston 51 to move toward the opposite side from the front cover 12 and stop pressing the first plate 60 and the second plate 62 into contact with each other, which can disengage the lock-up clutch 50.

In a vehicle equipped with such a hydraulic transmission apparatus 10, the lock-up clutch 50 is disengaged at the time of starting of the vehicle etc., so that power from the engine is transmitted to the pump impeller 20 through the front cover 12 (front hub 14). The resulting rotation of the pump impeller 20 is transmitted to the turbine runner 30 through a hydraulic fluid inside the converter chamber 48 to rotate the turbine runner 30 (turbine hub 32). Thus, the power from the engine is transmitted to the input shaft of the transmission device. On the other hand, when a vehicle equipped with the hydraulic transmission apparatus 10 is running at low speeds, for example, slip control is performed in which the oil pressure inside the engaging oil chamber 58 is gradually raised such that a difference between the rotation speed of the crankshaft (pump impeller 20) of the engine and the rotation speed of the input shaft (turbine runner 30) of the transmission device meets a target rotation speed. When a predetermined lock-up clutch engaging condition based on the vehicle speed, the accelerator operation amount, etc. is met during the slip control, the oil pressure inside the engaging oil chamber 58 is controlled so as to engage the lock-up clutch 50.

Figure 2:
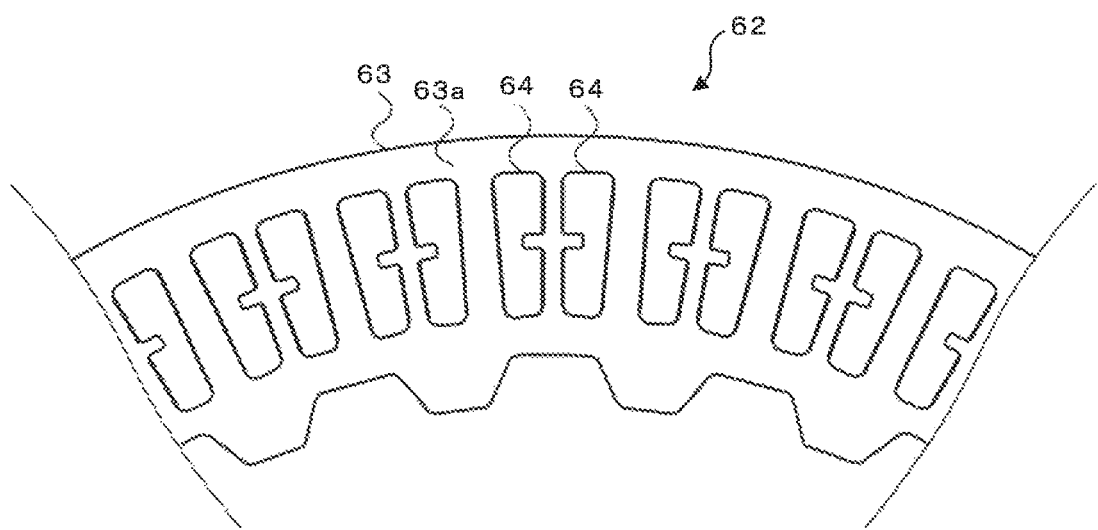
FIG. 2 is a configuration view showing a schematic configuration of a second plate.
Figure 3:
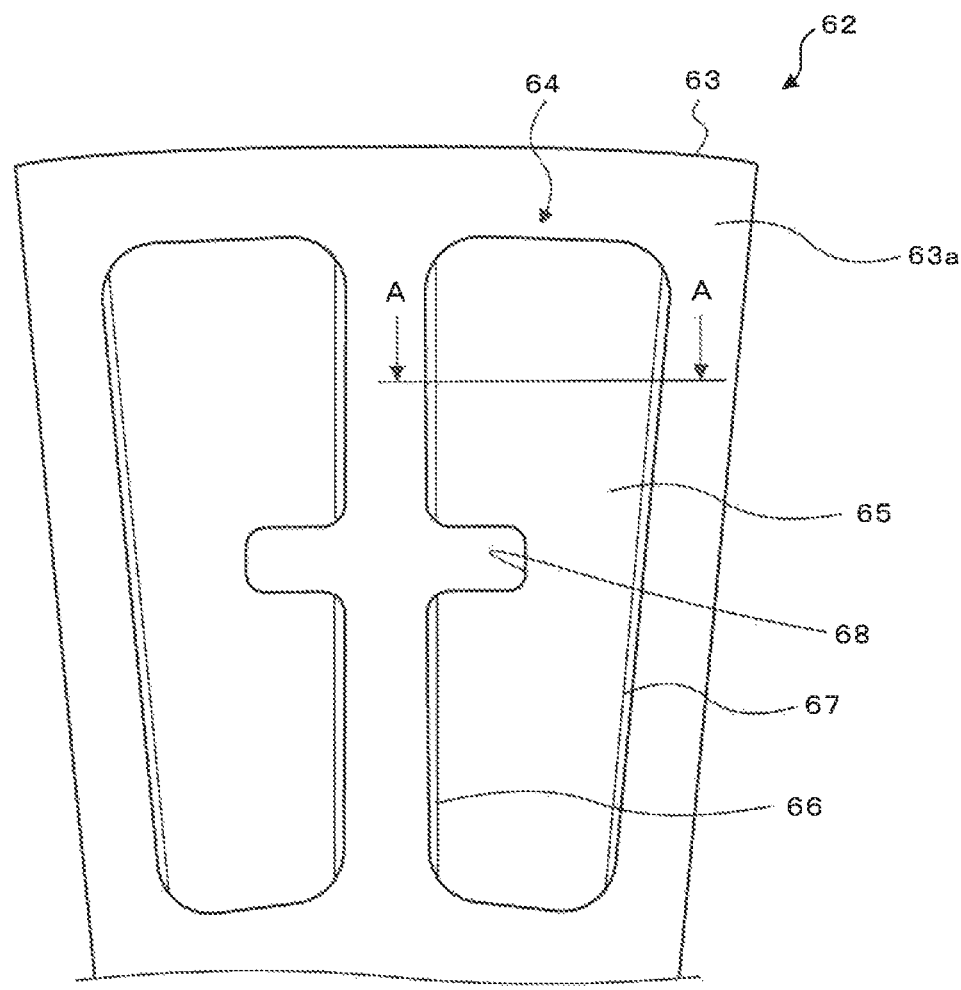
FIG. 3 is a partially enlarged view of the second plate.
Figure 4:
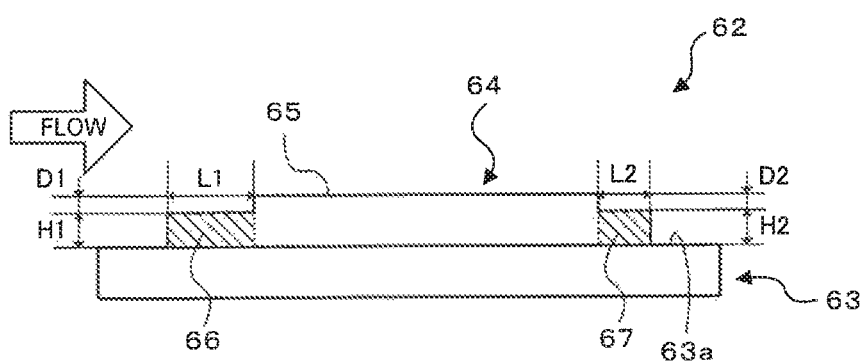
FIG. 4 is a sectional view showing section A-A in FIG. 3.

The configuration of the second plate 62 that is a friction plate will be further described. FIG. 2 is a configuration view showing a schematic configuration of the second plate 62. FIG. 3 is a partially enlarged view of the second plate 62. FIG. 4 is a sectional view showing section A-A in FIG. 3. As shown in FIG. 2, the second plate 62 includes a base plate 63 having an annular plate shape, and the plurality of pairs of friction members 64, 64 that is fixed to a plate surface 63a of the base plate 63, at regular intervals along a circumferential direction of the second plate 62 (hereinafter referred to simply as the circumferential direction). As one pair of friction members 64, 64 is two friction members that are formed in the same shape by press molding and disposed symmetrically, these friction members 64, 64 will be referred to simply as the friction members 64 unless it is necessary to distinguish therebetween.

As shown in FIG. 3 and FIG. 4, the friction member 64 is a protruding member having a protruding shape in cross-section in the circumferential direction (see FIG. 4), with a top portion (contact portion) 65 that comes in contact with the opposite first plate 60 when the lock-up clutch 50 is engaged, and step portions 66, 67 that are located respectively on both sides of the top portion 65 in the circumferential direction of the second plate 62 and have a smaller height from the plate surface 63a than the top portion 65. For the convenience of description, the step portions 66, 67 shown in FIG. 4 are enlarged from those in FIG. 3. The friction member 64 further has a cutout 68 formed by cutting out a portion of one end of the friction member 64 in the circumferential direction, at a substantially central position in a radial direction of the second plate 62. Each pair of friction members 64 is disposed symmetrically as described above, with the cutouts 68 of the right and left friction members 64, 64 facing each other.

To form the friction member 64, first, a blank having the cutout 68 is formed by punching, and then the step portions 66, 67 are formed by surface pressing respectively on both sides of the top portion 65. Forming the step portions 66, 67 can remove burrs and sharp edges resulting from punching, and can thereby prevent the flow of the hydraulic fluid from being hindered by such burrs and sharp edges. The step portions 66, 67 are formed so as to have a width that is 0.20 mm or larger and smaller than the width of the top portion 65 in the circumferential direction of the second plate 62. Here, the arrow in FIG. 4 indicates a flow direction of the hydraulic fluid when the rotation speed of the crankshaft of the engine (pump impeller 20) is higher than the rotation speed of the input shaft (turbine runner 30) of the transmission device (when the lock-up clutch 50 is disengaged). In this embodiment, the step portion 66 on the left side in FIG. 4 that is the upstream side in the flow direction indicated in FIG. 4 (hereinafter referred to as the upstream-side step portion 66), and the step portion 67 on the right side in FIG. 4 that is the downstream side in the flow direction (hereinafter referred to as the downstream-side step portion 67) are different in size from each other. Specifically, a width L1 of the upstream-side step portion 66 in the circumferential direction is larger than a width L2 of the downstream-side step portion 67 in the circumferential direction, while a height H1 of the upstream-side step portion 66 from the plate surface 63a and a height H2 of the downstream-side step portion 67 from the plate surface 63a are equal to each other. Such shapes can be formed by setting an indentation width (L1) of the upstream-side step portion 66 to be larger than an indentation width (L2) of the downstream-side step portion 67, and setting an indentation depth (height) D1 of the upstream-side step portion 66 and an indentation depth D2 of the downstream-side step portion 67 to be equal to each other, during surface pressing. The width L1 of the upstream-side step portion 66 is set to be approximately 0.5 to 1 mm larger than the width L2 of the downstream-side step portion 67 such that the width L1 becomes larger than the width L2 even when a manufacturing variation occurs, such as displacement of the friction member 64 during surface pressing. Thus, even when a manufacturing variation of the friction member 64 occurs, the width L1 of the upstream-side step portion 66 becomes larger than the width L2 of the downstream-side step portion 67, and the cross-sectional area of the upstream-side step portion 66 in the circumferential direction becomes larger than the cross-sectional area of the downstream-side step portion 67 in the circumferential direction.

Figure 5:
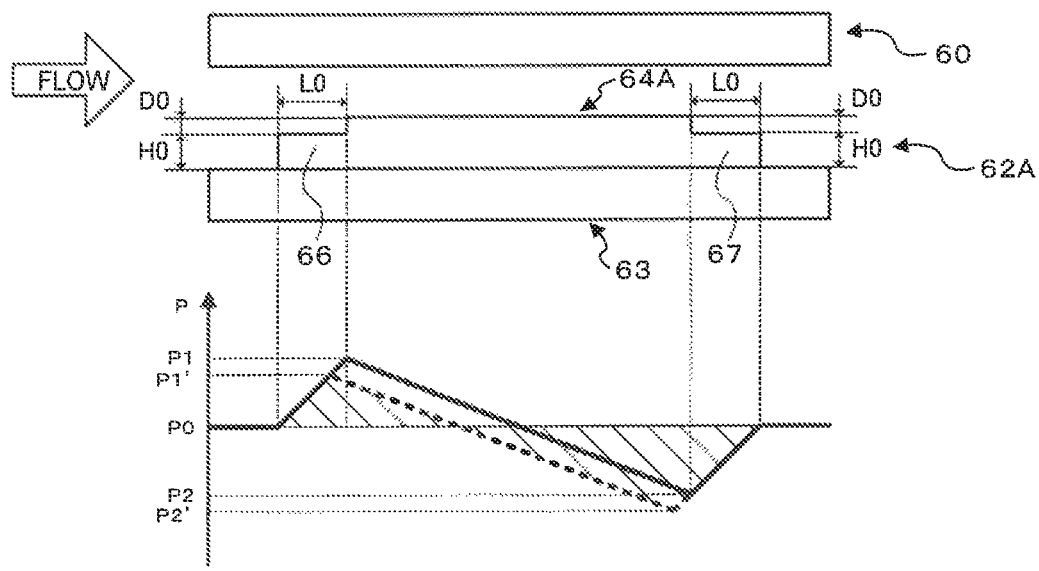
FIG. 5 is a view illustrating changes in an oil pressure occurring between plates due to a friction member of a comparative example while a lock-up clutch is disengaged.
Figure 6:
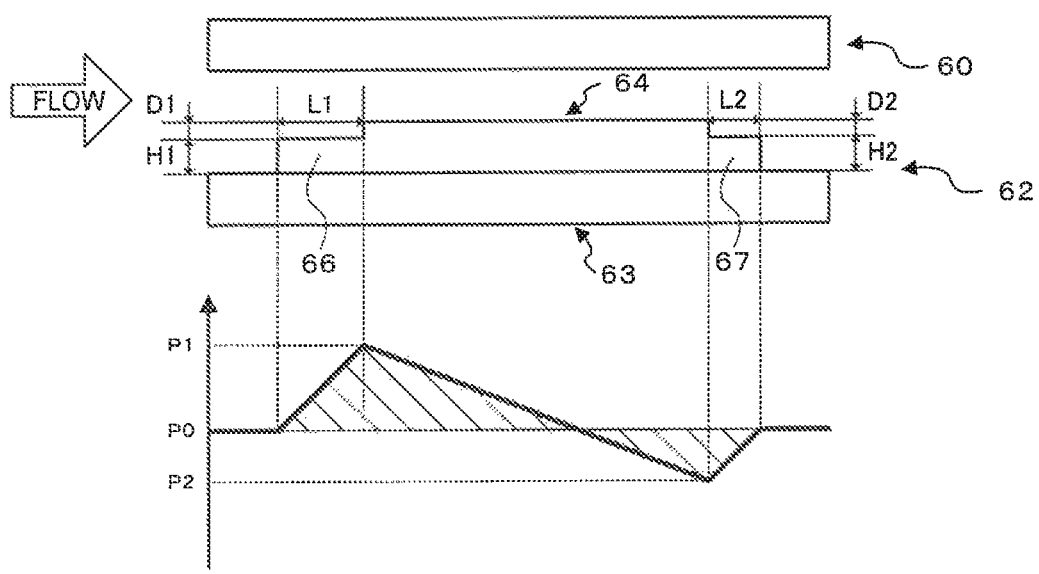
FIG. 6 is a view illustrating changes in the oil pressure occurring between plates due to a friction member of the embodiment while the lock-up clutch is disengaged.

The reason why the friction member 64 is thus shaped will be described. FIG. 5 is a view illustrating changes in the oil pressure occurring between plates 60, 62A due to a friction member 64A of a comparative example while the lock-up clutch 50 is disengaged, and FIG. 6 is a view illustrating changes in the oil pressure occurring between the plates 60, 62 due to the friction member 64 of the embodiment while the lock-up clutch 50 is disengaged. In the comparative example of FIG. 5, unlike in the embodiment, the upstream-side step portion 66 and the downstream-side step portion 67 are designed to have an equal width L0 in the circumferential direction and an equal height H0 from the plate surface 63a (indentation depth D0). Here, the clearance between the plates 60, 62 (62A) narrows at a part where the friction member 64 (64A) is provided, so that the oil pressure of the hydraulic fluid having flowed into the clearance between the plates 60, 62 (62A) changes from a reference pressure P0 thereof at a part where the friction member 64 (64A) is not provided. At the upstream-side step portion 66, the oil pressure tends to change toward the positive pressure side due to compression as the clearance between the plates 60, 62 (62A) narrows, whereas at the downstream-side step portion 67, the oil pressure tends to change toward the negative pressure side due to expansion as the clearance between the plates 60, 62 (62A) widens. FIG. 5 and FIG. 6 also schematically show changes in the oil pressure calculated based on a fluid analysis of a pressure distribution inside a wedge, with reference to the formula of wedge effect ("Handbook of Hydraulics and Pneumatics," the Japan Fluid Power System Society, p. 40). Here, the portion of the friction member 64 from an upstream-side edge of the upstream-side step portion 66 to near the center of the top portion 65 is regarded as a wedge formed by the clearance that narrows along the flow direction, and the portion of the friction member 64 from near the center of the top portion 65 to a downstream-side edge of the downstream-side step portion 67 is regarded as a wedge formed by the clearance that widens along the flow direction. As shown in FIG. 5, the pressure changes so as to rise from the reference pressure P0 and reach a highest pressure P1 on the positive pressure side at the border between the upstream-side step portion 66 and the top portion 65, and then decrease and reach a highest pressure P2 on the negative pressure side at the border between the top portion 65 and the downstream-side step portion 67 before rising to the reference pressure P0. The pressure P1 tends to be higher on the positive pressure side as the width L is larger and be higher on the positive pressure side as the height H is larger (the depth D is smaller), while the pressure P2 tends to be higher on the negative pressure side as the width L is larger and be higher on the negative pressure side as the height H is larger (the depth D is smaller).

Thus, in the comparative example, when the upstream-side step portion 66 and the downstream-side step portion 67 are formed in the same size as designed, the absolute value of the pressure P1 and the absolute value of the pressure P2 become equal to each other, so that the pressure changes as indicated by the solid line in FIG. 5. In this case, the amount of change toward the positive pressure side and the amount of change toward the negative pressure side become substantially equal to each other and offset each other. However, these step portions are not always formed as designed due to displacement of the friction member 64 during surface pressing etc. In this case, for example, when the width of the downstream-side step portion 67 is larger than the width of the upstream-side step portion 66, as indicated by the dashed line in FIG. 5, a pressure P1' at the upstream-side step portion 66 becomes lower than the pressure P1 in terms of absolute value, while a pressure P2' at the downstream-side step portion 67 becomes higher than the pressure P2 in terms of absolute value. Then, the load acting between the first plate 60 and the second plate 62A becomes larger on the negative pressure side (the difference in area between the shaded portions). Accordingly, the first plate 60 and the second plate 62A are drawn to each other with a larger force, resulting in an increase in the drag torque. An increase in the drag torque can lead to a decrease in power transmission efficiency. In particular, the influence of the drag torque is significant when the rotation speed of the engine is low, such as at the time of starting of the vehicle, in a state where the temperature of the hydraulic fluid is low and therefore the viscosity thereof is high; for example, the drag torque may greatly impair the controllability of the rotation speed of the engine or cause the engine to stop.

In this embodiment, therefore, as described above, the width L1 of the upstream-side step portion 66 and the width L2 of the downstream-side step portion 67 are set such that the width L1 becomes larger than the width L2 even when a manufacturing variation of the friction member 64 occurs, such as displacement during surface pressing. Thus, as shown in FIG. 6, the absolute value of the pressure P1 becomes reliably larger than the absolute value of the pressure P2, so that, even when a manufacturing variation occurs, the load acting between the first plate 60 and the second plate 62 can be made larger on the positive pressure side (the difference in area between the shaded portions). As a result, a force acts so as to separate the first plate 60 and the second plate 62 from each other, which can prevent a drag torque attributable to a manufacturing variation, and prevent a decrease in the controllability of the lock-up clutch 50. Moreover, when all the friction members 64 fixed to the plurality of second plates 62 are formed in such a shape, the drag torque can be reduced by the lock-up clutch 50 as a whole even when a manufacturing variation of the second plate 62 occurs.

As described above, the friction member 64 has the cutout 68 that is formed by cutting out a portion of the friction member 64. Thus, for example, the hydraulic fluid having flowed into the cutout 68 can be accumulated in the friction member 64 of the pair of friction members 64, 64 that is disposed on the downstream side in the flow direction of the hydraulic fluid (e.g., the right side in FIG. 3). When the oil pressure of the hydraulic fluid accumulated inside the cutout 68 rises, this hydraulic fluid flows onto the top portion 65, causing a change in the oil pressure at the top portion 65 toward the positive pressure side. Thus, in the downstream-side friction member 64, both the effect of the width L1 of the upstream-side step portion 66 being larger than the width L2 of the downstream-side step portion 67 and the effect of the formation of the cutout 68 can promote the tendency that the oil pressure between the first plate 60 and the second plate 62 changes toward the positive pressure side. As a result, the force separating the first plate 60 and the second plate 62 from each other can be increased, and thereby an increase in the drag torque can be further prevented.

According to the second plate 62 (friction plate) of the present disclosure having been described above, the upstream-side step portion 66 and the downstream-side step portion 67 of the friction member 64 are different in shape from each other such that, while the lock-up clutch 50 is disengaged, the amount of change in the oil pressure toward the positive pressure side occurring at the upstream-side step portion 66 is larger than the amount of change in the oil pressure toward the negative pressure side occurring at the downstream-side step portion 67. Thus, the force separating the first plate 60 and the second plate 62 from each other can be increased by the positive pressure acting therebetween. As a result, an increase in the drag torque attributable to a manufacturing variation of the friction plate can be prevented while the lock-up clutch 50 is disengaged, and thereby the problem of a decrease in power transmission efficiency etc. can be avoided.

According to the second plate 62 of the present disclosure, the upstream-side step portion 66 and the downstream-side step portion 67 of the friction member 64 are formed such that the width L1 of the upstream-side step portion 66 and the width L2 of the downstream-side step portion 67 in the circumferential direction are different from each other while the heights thereof are equal to each other. Thus, simply differentiating the surface pressing widths during surface pressing can form the upstream-side step portion 66 and the downstream-side step portion 67 in different sizes. It is therefore possible to prevent an increase in the drag torque without the need for complicated processing of the step portions or for burdensome management of providing a difference in the amount of indentation during surface pressing etc.

According to the second plate 62 of the present disclosure, the friction members 64 are provided along the entire circumference of the base plate 63, at regular intervals in the circumferential direction thereof. Thus, while the lock-up clutch 50 is disengaged, the effect of the friction member 64 causing a positive pressure to act between the first plate 60 and the second plate 62 occurs along the entire circumferences of both plates, which can more reliably prevent an increase in the drag torque.

In the second plate 62 of the present disclosure, the upstream-side step portion 66 and the downstream-side step portion 67 have been described as being formed such that the width L1 of the upstream-side step portion 66 and the width L2 of the downstream-side step portion 67 in the circumferential direction are different from each other while the heights H1, H2 thereof are equal to each other. However, the step portions are not limited to this example. For example, the upstream-side step portion 66 and the downstream-side step portion 67 may be formed such that the height H1 of the upstream-side step portion 66 and the height H2 of the downstream-side step portion 67 are different from each other while the width L1 and the width L2 thereof in the circumferential direction are equal to each other. In that case, the height H1 of the upstream-side step portion 66 can be larger than the height H2 of the downstream-side step portion 67, i.e., the indentation depth D1 of the upstream-side step portion 66 can be smaller than the indentation depth D2 of the downstream-side step portion 67 (the upstream-side step portion 66 can have a smaller difference in level from an upper surface of the top portion 65 than the downstream-side step portion 67). Alternatively, the width L1 of the upstream-side step portion 66 and the width L2 of the downstream-side step portion 67 in the circumferential direction, as well as the height H1 (indentation depth D1) of the upstream-side step portion 66 and the height H2 (indentation depth D2) of the downstream-side step portion 67 can be different from each other. In that case, for example, the width L1 of the upstream-side step portion 66 can be larger than the width L2 of the downstream-side step portion 67, and moreover the height H1 of the upstream-side step portion 66 can be larger than the height H2 of the downstream-side step portion 67 (the indentation depth D1 can be smaller than the indentation depth D2).

Figure 7:
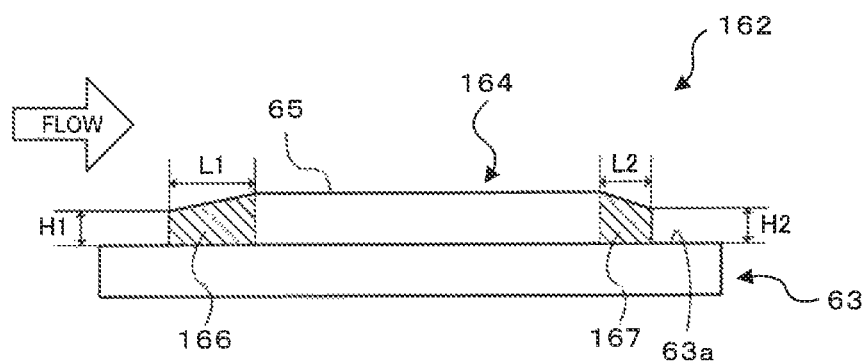
FIG. 7 is a sectional view of a second plate of a modified example.

In the second plate 62 of the present disclosure, the upstream-side step portion 66 and the downstream-side step portion 67 have been described as having the same rectangular shape in cross-section in the circumferential direction. However, the step portions are not limited to this example and may instead have different shapes. For example, the cross-sectional shape of the upstream-side step portion 66 in the circumferential direction can be a rectangular shape as in the present disclosure, while the cross-sectional shape of the downstream-side step portion 66 in the circumferential direction can be a wedge shape that is inclined such that the height from the plate surface 63*a* to the upper surface of the step portion decreases toward the downstream side. FIG. 7 is a sectional view of a second plate 162 of a modified example corresponding to this case. As shown in FIG. 7, in a friction member 164 of this modified example, an upstream-side step portion 166 has a wedge shape that is inclined such that the height from the plate surface 63*a* increases with a decreasing distance from the top portion 65, while a downstream-side step portion 167 has a wedge shape that is inclined such that the height from the plate surface 63*a* decreases with an increasing distance from the top portion 65. Such a second plate can achieve effects similar to those of the second plate 62 of the present disclosure. Alternatively, the upstream-side step portion 66 and the downstream-side step portion 67 can be different from each other in the chamfered shape at the edge, the rounded shape, the tapered shape, etc. Moreover, a step portion may be formed on one of the upstream side and the downstream side while a wedge-shaped portion may be formed on the other side, or a step portion (wedge-shaped portion) may be formed on only one side. Thus, the upstream-side step portion 66 and the downstream-side step portion 67 can have various shapes that are different from each other. To differentiate the shapes of the upstream-side step portion 66 and the downstream-side step portion 67 from each other, it is also possible to form the upstream-side step portion 66 so as to have a larger cross-sectional area in the circumferential direction than the downstream-side step portion 67. The upstream-side step portion 66 thus having a larger cross-sectional area has a higher effect of compressing the hydraulic fluid, so that, as in the second plate 62 of the present disclosure, the amount of change in the oil pressure toward the positive pressure side occurring at the upstream-side step portion 66 can be made larger than the amount of change in the oil pressure toward the negative pressure side occurring at the downstream-side step portion 67.

Figure 8:
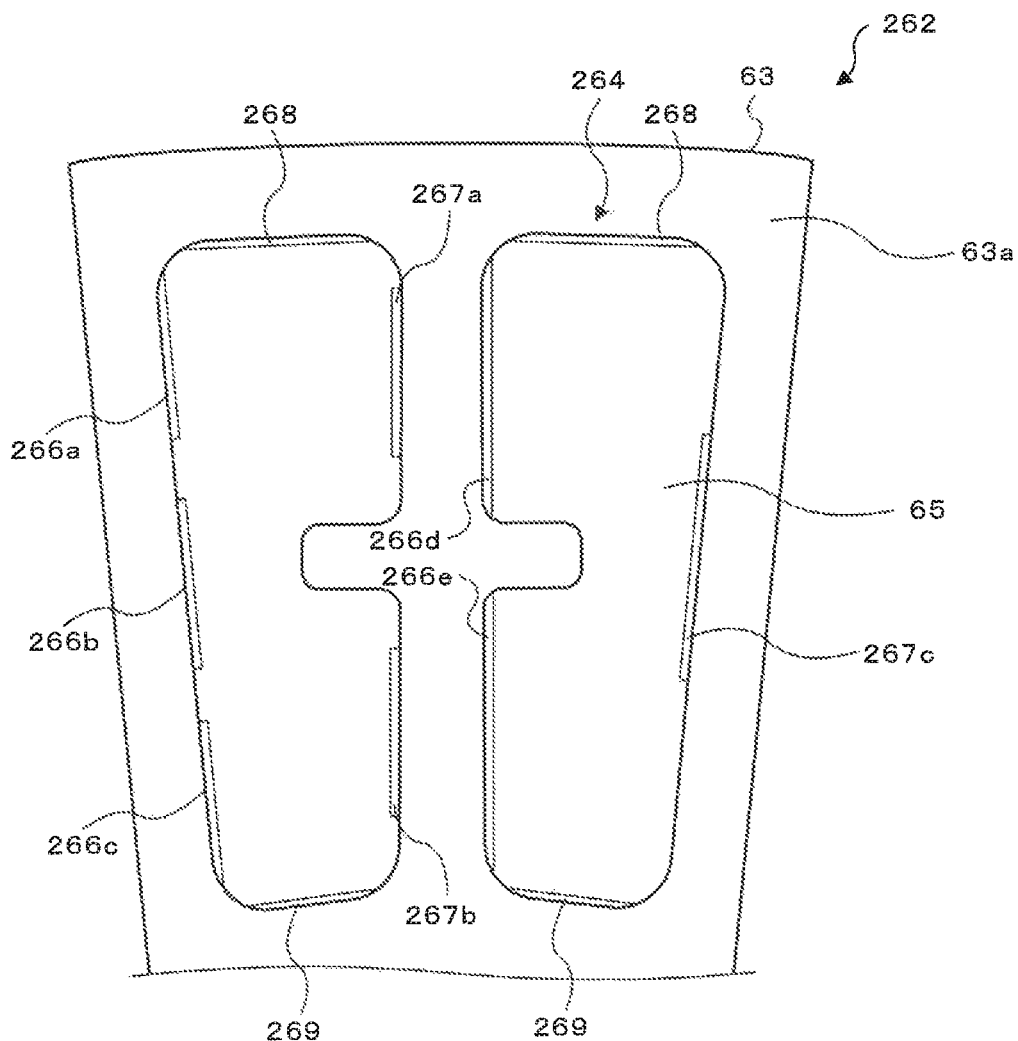
FIG. 8 is a partially enlarged view of a second plate of another modified example.

FIG. 8 shows a partially enlarged view of a second plate 262 of another modified example. As shown in FIG. 8, in a friction member 264 of this modified example, a step portion 268 is formed on an outer side in the radial direction, and a step portion 269 is formed on an inner side in the radial direction. Thus, in the friction member 264 of this modified example, the step portions 268, 269 are formed respectively on the outer side and the inner side in the radial direction, in addition to the step portions in the circumferential direction. However, the friction member 264 is not limited to the one having step portions formed on the outer side and the inner side in the radial direction. The portions of the friction member 264 on the outer side and the inner side in the radial direction can be formed as various differently shaped portions that are shaped differently from the top portion 65; for example, these portions may have a wedge shape of which the height increases with a decreasing distance from the top portion 65. Moreover, the friction member 264 is not limited to the one having the differently shaped portion on each of the outer side and the inner side in the radial direction, and the differently shaped portion may be formed on only one of the outer side and the inner side. Furthermore, the friction member 264 is not limited to the one having the differently shaped portion on the outer side (or the inner side) formed along the entire length of the friction member 264 in the circumferential direction. Instead, the differently shaped portion may be formed to an intermediate point of the friction member 264 in the circumferential direction, or may be partially formed at a plurality of positions. In the case where the differently shaped portion is formed to an intermediate point of the friction member 264 in the circumferential direction, for example, the differently shaped portion may be formed only on the upstream side in the circumferential direction. Alternatively, the step portions only in the radial direction (the step portion on at least one of the outer side and the inner side (one of the step portions 268, 269 in FIG. 8)) may be formed as the step portion of the friction member, while the step portions in the circumferential direction (the upstream-side step portion 66 and the downstream-side step portion 67; step portions 266a to 266e, 267a to 267c in FIG. 8) may be omitted. Thus, the friction member 264 may be a member which has a contact portion that comes in contact with the object to be subjected to friction when the friction engagement device is engaged, and of which a portion on at least one side of the contact portion in the radial direction is formed so as to have a smaller height from the plate surface than the contact portion (is shaped differently from the contact portion). Such a portion shaped differently from the contact portion may be formed, as in the second plate 62 of the present disclosure, such that the amount of change in the oil pressure toward the positive pressure side occurring on the upstream side becomes larger than the amount of change in the oil pressure toward the negative pressure side occurring on the downstream side.

In the friction member 264 of the modified example of FIG. 8, the number of the step portions on the upstream side in the circumferential direction and the number of the step portions on the downstream side in the circumferential direction are different from each other. For example, in the friction member 264 on the left side, three step portions 266a, 266b, 266c are formed on the upstream side and two step portions 267a, 267b are formed on the downstream side. In the friction member 264 on the right side, two step portions 266d, 266e are formed on the upstream side and one step portion 267c is formed on the downstream side. However, the pair of friction members 264, 264 is not limited to the friction members 264 different from each other in the number of the step portions, and instead may be different from each other in the area of the step portions as seen from above or in the width or the length of the step portions. Some or all of the step portions 266a to 266e, 267a to 267c may have a wedge shape of which the height increases with a decreasing distance from the top portion 65. Alternatively, the right and left friction members 264 may have the same shape.

In the second plate 62 of the present disclosure, the plurality of friction members 64 has been described as being the plurality of segment members that is provided along the entire circumference of the base plate 63, at regular intervals in the circumferential direction thereof. However, the friction member is not limited to this example, and may instead be a single member that is provided on the base plate 63 continuously in the circumferential direction thereof. In other words, one annular friction member may be provided on the base plate 63. In this case, the top portion 65 and the step portion are formed alternately in the friction member. Alternatively, this annular friction member may be interrupted at one portion so as to form a C-shape. Moreover, this annular friction member may be halved into two parts, or may be divided into a plurality of parts, for example, three or four parts.

In the second plate 62 of the present disclosure, the pair of friction members 64, 64 has been described as each having the cutout 68. However, the pair of friction members 64, 64 is not limited to this example, and instead only the friction member 64 of the pair of friction members 64, 64 that is disposed on the downstream side in the flow direction of the hydraulic fluid (the right side in FIG. 3) may have the cutout 68. The friction member 64 has been described as having the cutout 68 at one position, but may instead have the cutout 68 at a plurality of positions. Alternatively, the cutout 68 may be omitted from the friction member 64.

The second plate 62 of the present disclosure has been described as being used in the multiple-disc lock-up clutch 50 having the pluralities of first plates 60 and second plates 62. However, the second plate 62 is not limited to this example, and may instead be used in a single-disc lock-up clutch having a single plate.

The second plate 62 of the present disclosure has been described as being used in the lock-up clutch 50 of a torque converter. However, the second plate 62 is not limited to this example, and may instead be a friction plate that is used in a friction engagement device, for example, a clutch or a brake, that produces shift speeds of a transmission device, such as an automatic transmission (AT).

As has been described above, the friction plate (62) of the present disclosure is the friction plate (62) that is used in the friction engagement device (50) configured to engage the input rotary member (12) and the output rotary member (32) with each other, and that includes the base plate (63) having an annular plate shape and the friction member (64) provided on the base plate (63) in the circumferential direction thereof. The friction member (64) has the contact portion (65) that comes in contact with the object to be subjected to friction (60), when the friction engagement device (50) is engaged, and the portion of the friction member (64) on at least one side of the contact portion (65) in the circumferential direction has a smaller height from the plate surface (63a) of the base plate (63) than the contact portion (65); and the portions of the friction member (64) on both sides of the contact portion (65) in the circumferential direction are different in shape from each other such that, when these portions are regarded as the upstream portion (66) and the downstream portion (67) that are respectively on the upstream side and the downstream side of the fluid flowing with the rotation speed of the input rotary member (12) higher than the rotation speed of the output rotary member (32), the amount of change in the fluid pressure toward the positive pressure side occurring at the upstream portion (66) is larger than the amount of change in the fluid pressure toward the negative pressure side occurring at the downstream portion (67).

Here, when the upstream portion (66) and the downstream portion (67) are designed to have the same shape, depending on a manufacturing variation, the amount of change toward the negative pressure side is larger than the amount of change toward the positive pressure side, resulting in a negative pressure acting between the friction plate (62) and the object to be subjected to friction (60). In the friction plate (62) of the present disclosure, the upstream portion and the downstream portion are different in shape from each other such that the amount of change in the fluid pressure toward the positive pressure side occurring at the upstream portion is larger than the amount of change in the fluid pressure toward the negative pressure side occurring at the downstream portion. Thus, the force separating the friction plate (62) and the object to be subjected to friction (60) from each other can be increased by a positive pressure acting therebetween. As a result, an increase in the drag torque attributable to a manufacturing variation of the friction plate (62) can be prevented. That the upstream portion and the downstream portion are different in shape from each other means that the upstream portion and the downstream portion can be different from each other in at least one of the width, the height, the tapered shape of the upper surface, and the rounded shape.

The upstream portion (66) may be formed so as to have a larger width in the circumferential direction than the downstream portion (67).

The upstream portion (66) may be formed so as to have a smaller difference in height from the contact portion (65) than the downstream portion (67).

The upstream portion (66) may be formed so as to have a larger cross-sectional area in the circumferential direction than the downstream portion (67).

The friction member (64) may be one of a plurality of segment members that is provided along the entire circumference of the base plate (63), at regular intervals in the circumferential direction thereof.

The friction member (64) may be a single member that is provided on the base plate (63) continuously in the circumferential direction thereof.

The friction member (64) may have a protruding shape, with the upstream portion (66) and the downstream portion (67) having a smaller height from the plate surface (63a) than the contact portion (65).

The upstream portion (166) of the friction member (164) may have a wedge shape that is inclined such that the height from the plate surface (63a) increases with a decreasing distance from the contact portion (65), and the downstream portion (167) of the friction member (164) may have a wedge shape that is inclined such that the height from the plate surface (63a) decreases with an increasing distance from the contact portion (65).

The friction member (64) may have at least one differently shaped portion (268, 269) that is shaped differently from the contact portion (65), on at least one side of the inner side and the outer side in the radial direction. Here, the differently shaped portion may be a step portion that is different in height from the contact portion, a tapered portion, etc.

The hydraulic transmission apparatus 10 of the present disclosure includes the lock-up clutch (50) that employs any one of the above friction plates (62). Thus, the effect of the friction plate (62), i.e., the effect of preventing an increase in the drag torque attributable to a manufacturing variation of the friction plate (62), is realized in the hydraulic transmission apparatus 10.

In the embodiment, the width of the upstream-side step portion 66 is larger than the width of the downstream-side step portion 67 in the circumferential direction while the heights thereof from the plate surface 63a (surface pressing depths) are equal to each other, such that the amount of change in the fluid pressure toward the positive pressure side occurring at the upstream-side step portion 66 is larger than the amount of change in the fluid pressure toward the negative pressure side occurring at the downstream-side step portion 67. However, the present disclosure is not limited to this example. Specifically, the amount of change in the fluid pressure toward the positive pressure side occurring at the upstream-side step portion 66 may be made smaller than the amount of change in the fluid pressure toward the negative pressure side occurring at the downstream-side step portion 67. For example, the width of the downstream-side step portion 67 may be larger than the width of the upstream-side step portion 66 in the circumferential direction while the heights thereof from the plate surface 63a may be equal to each other, or the height from the plate surface 63a of the downstream-side step portion 67 may be larger than that of the upstream side step portion 66 while the widths thereof in the circumferential direction may be equal to each other, or the height from the plate surface 63a and the width in the circumferential direction of the downstream-side step portion 67 may be larger than those of the upstream-side step portion 66. The downstream-side step portion 67 may have a larger cross-sectional area in the circumferential direction than the upstream-side step portion 66. Thus, even when a manufacturing variation occurs, the force drawing the first plate 60 and the second plate 62 to each other can be increased by a negative pressure acting therebetween. As a result, for example, when the first plate 60 and the second plate 62 are to be engaged with each other, these plates can be more quickly moved toward each other, which can improve the responsiveness during the slip control or in engaging the lock-up clutch.

Here, the correspondence relationships between the main elements of the above embodiment and the main elements of the disclosure of the present disclosure described in the section Summary of the Disclosure will be described. In the above embodiment, the front cover 12 (front hub 14) corresponds to the input rotary member; the turbine hub 32 corresponds to the output rotary member; the second plate corresponds to "the friction plate;" the base plate 63 corresponds to "the base plate;" the friction member 64 corresponds to "the friction member;" the top portion 65 corresponds to "the contact portion;" the upstream-side step portion 66 corresponds to "the upstream portion;" and the downstream-side step portion 67 corresponds to "the downstream portion." The hydraulic transmission apparatus 10 including the lock-up clutch 50 corresponds to "the hydraulic transmission device."

It should be understood that the disclosure of the present disclosure is in no way limited to the above embodiment, but that various modifications can be made within an extended scope of the present disclosure. Moreover, the above embodiment is merely a specific form of the disclosure described in the section Summary of the Disclosure, and is not intended to limit the elements of the disclosure described in the section Summary of the Disclosure.

INDUSTRIAL APPLICABILITY

The disclosure of the present disclosure can be applied to industries, for example, that involve manufacturing a hydraulic transmission apparatus having a lock-up clutch.

The invention claimed is:

1. A friction plate that is used in a friction engagement device configured to engage an input rotary member and an output rotary member with each other, the friction plate comprising:
a base plate having an annular plate shape; and
a friction member provided on the base plate in a circumferential direction of the friction plate, wherein:
the friction member has a contact portion that comes in contact with an object to be subjected to friction, when the friction engagement device is engaged, and a portion of the friction member on at least one side of the contact portion in the circumferential direction has a smaller height from a plate surface of the base plate than the contact portion; and
portions of the friction member on both sides of the contact portion in the circumferential direction are different in shape from each other such that, when these portions are regarded as an upstream portion and a downstream portion in the circumferential direction that are respectively on an upstream side and a downstream side of a fluid flowing with a rotation speed of the input rotary member higher than a rotation speed of the output rotary member, an amount of change in a fluid pressure toward a positive pressure side occurring at the upstream portion is larger than an amount of change in the fluid pressure toward a negative pressure side occurring at the downstream portion, wherein
the upstream portion is formed so as to have a larger width in the circumferential direction than the downstream portion.

2. The friction plate according to claim 1, wherein
the friction member is one of a plurality of segment members that is provided along the entire circumference of the base plate, at regular intervals in the circumferential direction of the friction plate.

3. The friction plate according to claim 1, wherein
the friction member is a single member that is provided on the base plate continuously in the circumferential direction of the friction plate.

4. The friction plate according to claim 1, wherein
the friction member has a protruding shape, with the upstream portion and the downstream portion having a smaller height from the plate surface than the contact portion.

5. The friction plate according to claim 1, wherein
the upstream portion of the friction member has a wedge shape that is inclined such that a height from the plate surface increases with a decreasing distance from the contact portion, and the downstream portion of the friction member has a wedge shape that is inclined such that a height from the plate surface decreases with an increasing distance from the contact portion.

6. The friction plate according to claim 1, wherein
the friction member has at least one differently shaped portion that is shaped differently from the contact portion, on at least one side of an inner side and an outer side in a radial direction.

7. A hydraulic transmission apparatus comprising a lock-up clutch that employs the friction plate according to claim 1.

8. A friction plate that is used in a friction engagement device configured to engage an input rotary member and an output rotary member with each other, the friction plate comprising:
a base plate having an annular plate shape; and
a friction member provided on the base plate in a circumferential direction of the friction plate, wherein:
the friction member has a contact portion that comes in contact with an object to be subjected to friction, when the friction engagement device is engaged, and a portion of the friction member on at least one side of the contact portion in the circumferential direction has a smaller height from a plate surface of the base plate than the contact portion; and
portions of the friction member on both sides of the contact portion in the circumferential direction are different in shape from each other such that, when these portions are regarded as an upstream portion and a downstream portion in the circumferential direction that are respectively on an upstream side and a downstream side of a fluid flowing with a rotation speed of the input rotary member higher than a rotation speed of the output rotary member, an amount of change in a fluid pressure toward a positive pressure side occurring at the upstream portion is larger than an amount of change in the fluid pressure toward a negative pressure side occurring at the downstream portion, wherein
the upstream portion is formed so as to have a smaller difference in height from the contact portion than the downstream portion.

9. The friction plate according to claim 8, wherein
the friction member is one of a plurality of segment members that is provided along the entire circumference of the base plate, at regular intervals in the circumferential direction of the friction plate.

10. The friction plate according to claim 8, wherein
the friction member is a single member that is provided on the base plate continuously in the circumferential direction of the friction plate.

11. The friction plate according to claim 8, wherein
the friction member has a protruding shape, with the upstream portion and the downstream portion having a smaller height from the plate surface than the contact portion.

12. The friction plate according to claim 8, wherein
the upstream portion of the friction member has a wedge shape that is inclined such that a height from the plate surface increases with a decreasing distance from the contact portion, and the downstream portion of the friction member has a wedge shape that is inclined such that a height from the plate surface decreases with an increasing distance from the contact portion.

13. The friction plate according to claim 8, wherein the friction member has at least one differently shaped portion that is shaped differently from the contact portion, on at least one side of an inner side and an outer side in a radial direction.

14. A hydraulic transmission apparatus comprising a lock-up clutch that employs the friction plate according to claim 8.

15. A friction plate that is used in a friction engagement device configured to engage an input rotary member and an output rotary member with each other, the friction plate comprising:

a base plate having an annular plate shape; and a friction member provided on the base plate in a circumferential direction of the friction plate, wherein:

the friction member has a contact portion that comes in contact with an object to be subjected to friction, when the friction engagement device is engaged, and a portion of the friction member on at least one side of the contact portion in the circumferential direction has a smaller height from a plate surface of the base plate than the contact portion; and portions of the friction member on both sides of the contact portion in the circumferential direction are different in shape from each other such that, when these portions are regarded as an upstream portion and a downstream portion in the circumferential direction that are respectively on an upstream side and a downstream side of a fluid flowing with a rotation speed of the input rotary member higher than a rotation speed of the output rotary member, an amount of change in a fluid pressure toward a positive pressure side occurring at the upstream portion is larger than an amount of change in the fluid pressure toward a negative pressure side occurring at the downstream portion, wherein the upstream portion is formed so as to have a larger cross-sectional area in the circumferential direction than the downstream portion.

16. The friction plate according to claim 15, wherein the friction member is one of a plurality of segment members that is provided along the entire circumference of the base plate, at regular intervals in the circumferential direction of the friction plate.

17. The friction plate according to claim 15, wherein the friction member is a single member that is provided on the base plate continuously in the circumferential direction of the friction plate.

18. The friction plate according to claim 15, wherein the friction member has a protruding shape, with the upstream portion and the downstream portion having a smaller height from the plate surface than the contact portion.

19. The friction plate according to claim 15, wherein the upstream portion of the friction member has a wedge shape that is inclined such that a height from the plate surface increases with a decreasing distance from the contact portion, and the downstream portion of the friction member has a wedge shape that is inclined such that a height from the plate surface decreases with an increasing distance from the contact portion.

20. The friction plate according to claim 15, wherein the friction member has at least one differently shaped portion that is shaped differently from the contact portion, on at least one side of an inner side and an outer side in a radial direction.

21. A hydraulic transmission apparatus comprising a lock-up clutch that employs the friction plate according to claim 15.

* * * * *